United States Patent
Lian et al.

(10) Patent No.: US 8,184,100 B2
(45) Date of Patent: May 22, 2012

(54) INERTIA SENSING INPUT CONTROLLER AND RECEIVER AND INTERACTIVE SYSTEM USING THEREOF

(75) Inventors: Jr-Wei Lian, Taipei County (TW);
Chih-Kai Chiu, Tainan (TW);
Shun-Nan Liou, Kaohsiung (TW);
Ming-Jye Tsai, Hsinchu County (TW);
Chun-Yuan Chen, Tainan (TW)

(73) Assignee: Industrial Technology Research Institute, Hsin-Chu (TW)

( * ) Notice: Subject to any disclaimer, the term of this patent is extended or adjusted under 35 U.S.C. 154(b) by 958 days.

(21) Appl. No.: 11/867,814

(22) Filed: Oct. 5, 2007

(65) Prior Publication Data
US 2009/0048021 A1 Feb. 19, 2009

(30) Foreign Application Priority Data
Aug. 16, 2007 (TW) .............................. 96130277 A

(51) Int. Cl.
*G06F 3/02* (2006.01)
*G09G 5/00* (2006.01)
(52) U.S. Cl. ........ 345/169; 348/734; 348/601; 345/163; 345/158; 345/161; 345/156; 463/30; 463/31; 463/36; 463/43; 463/38; 273/148 B
(58) Field of Classification Search .......... 345/157–172, 345/156; 348/734, 601; 463/30, 31, 43, 463/38; 273/148 B
See application file for complete search history.

(56) References Cited

U.S. PATENT DOCUMENTS

| | | | |
|---|---|---|---|
| 5,440,326 A | 8/1995 | Quinn | |
| 5,898,421 A | 4/1999 | Quinn | |
| 6,285,354 B1 * | 9/2001 | Revis | 345/163 |
| 6,313,827 B1 * | 11/2001 | Honjyou | 345/163 |
| 6,782,245 B1 | 8/2004 | Lazzarotto et al. | |
| 2002/0126026 A1 * | 9/2002 | Lee et al. | 341/22 |
| 2006/0007115 A1 | 1/2006 | Furuhashi et al. | |

(Continued)

FOREIGN PATENT DOCUMENTS

CN 1866181 11/2006

(Continued)

OTHER PUBLICATIONS

Taiwan Intellectual Property Office "Office Action", Sep. 28, 2010, Taiwan R.O.C.

*Primary Examiner* — Lun-Yi Lao
*Assistant Examiner* — Kelly B Hegarty
(74) *Attorney, Agent, or Firm* — WPAT., P.C.; Justin King

(57) ABSTRACT

An inertial sensing input controller, receiver and interactive system using thereof are provided in the present invention. The inertial sensing input controller functioning to capture motions of a human body comprises an inertial sensing module for sensing a sequence of motions of the human body and generating the corresponding parameters and then transmitting to a receiver connected to an electrical device. In addition, the inertial sensing input controller further integrates a plurality of communication protocols and the electrical device interacting with the inertial sensing input controller can be switched to different control modes according to the parameters received by the receiver. On the other hand, the parameters generated by the inertial sensing input controller can be transmitted to the electrical device directly so that the electrical device can process the parameters and judge the action or scenario with respect to the human movement accordingly for increasing diversity of interactions.

17 Claims, 10 Drawing Sheets

U.S. PATENT DOCUMENTS

| | | |
|---|---|---|
| 2006/0055673 A1* | 3/2006 | Wu .................. 345/163 |
| 2006/0077180 A1* | 4/2006 | Kirtley et al. .......... 345/168 |
| 2006/0209014 A1* | 9/2006 | Duncan et al. .......... 345/156 |
| 2007/0072680 A1* | 3/2007 | Ikeda .................. 463/43 |

FOREIGN PATENT DOCUMENTS

| | | | |
|---|---|---|---|
| CN | 1867081 | | 11/2006 |
| CN | 1987752 | | 6/2007 |
| JP | 2001236174 | * | 8/2001 |
| JP | 2005243021 | | 9/2005 |
| TW | 313840 | | 6/2007 |
| TW | 316440 | | 8/2007 |
| WO | 2004102371 | | 11/2004 |
| WO | 2005103863 | | 11/2005 |

* cited by examiner

| Mouse input flag | Joystick input flag | Keyboard input flag | Input mode selection |
|---|---|---|---|
| 1 | 0 | 0 | Mouse mode |
| 0 | 1 | 0 | Joystick mode |
| 0 | 0 | 1 | Keyboard mode |
| 1 | 1 | 0 | Mouse+Joystick mode |
| 0 | 1 | 1 | Joystick+Keyboard mode |
| 1 | 0 | 1 | Mouse+Keyboard mode |
| 1 | 1 | 1 | Mouse+Joystick+Keyboard mode |

FIG. 4

INERTIA SENSING INPUT CONTROLLER AND RECEIVER AND INTERACTIVE SYSTEM USING THEREOF

FIELD OF THE INVENTION

The present invention relates to an input controller and the receiver thereof, and more particularly, to an inertial sensing input controller with motion sensing ability that is capable of switching between various input modes for interacting with an electronic device.

BACKGROUND OF THE INVENTION

After developing for years on the high gear, multimedia game enjoys great breakthrough not only in its audio and graphic performances, but also in it animation capability, since the computation abilities of electronic devices relating to multimedia games had been greatly improved which is directly resulted from the recent rapid development of semiconductor industry. Hence, players can now enjoys a multimedia game in a virtual-reality environment full of sounds and images.

Although the fun of playing multimedia games can be greatly enhancing by the improvement of audio/video effect, it is noted that for most multimedia games, conventional input interface, such as keyboard, joystick, or mouse, etc., are still used by players as the control device. In another word, as players can only interact with multimedia games through such conventional handheld input interfaces, the fun of playing multimedia games is reduced.

There are already some techniques for improving such disadvantage. One such technique is a game controller disclosed in U.S. Pub. No. 20070072680, entitled "Game controller and game system". The aforesaid game controller is a revolutionary device by which any motions of a game player can be used for controlling movements of a character displayed on a game console. One representative gaming system is the fifth home video game console "Wii" released by Nintendo. A distinguishing feature of the Wii console is its wireless controller, the Wii Remote, which can be used as a handheld pointing device and can detect acceleration in three dimensions. This design allows users to control the game using physical gestures as well as traditional button presses so that not only the conventional joysticks with a plurality of press buttons are considered to be obsolete, but it also make possible a new form of player interaction.

However, the aforesaid device still lacks the ability to integrate functions of different input devices into a single input device. Although in U.S. Pat. No. 6,782,245, entitled "Wireless peripheral interface with universal serial bus port", the wireless peripheral interface is provided to be used for coupling with a Universal Serial Bus (USB) port for connecting a wireless peripheral with a host computer, by which wireless peripheral devices (e.g., keyboard, mouse, trackball, touch pad, joysticks, and game controllers), transmitting communication signals to the peripheral interface, are received and processed into formats suitable for transmission to the host computer via USB. Nevertheless, the aforesaid interface is still short in that: conventional input devices (e.g., keyboard, mouse, trackball, touch pad, joysticks, and game controllers) are still used as control device for the host computer that the aforesaid wireless peripheral interface lacks the ability to integrate all those peripheral devices coupled to such wireless peripheral devices into one single control device; and thus a game executed on the host computer is played by those conventional mouse.

Therefore, an inertial sensing input control apparatus is needed for providing users with an integrated operation interface to interact with an electronic device connected thereto.

SUMMARY OF THE INVENTION

The object of the present invention is to provide an inertial sensing input controller, a receiver and an interactive system using thereof, in which the controller uses an inertial sensing module to capture physical gestures and motions of a user for generating motion parameters accordingly, and the receiver can perform a computation process upon the motion parameters received from the controller for identifying the user's gestures and motions, and then the identification result of the computation process is transmitted to an electronic device coupled to the receiver so that the user is able to interact with the electronic device.

Another object of the invention is to provide an inertial sensing input controller, a receiver and an interactive system using thereof, in which the controller having a plurality of communication protocols integrated therein is capable of selecting one communication protocol from the plurality communication protocol while transmitting an input signal relating to the selected communication protocol to the receiver, and the receiver can direct an electrical device to switch to a control mode according to the selected communication protocol, so that a user playing the interactive system will not need to shift between different input control devices just for meeting different control requirements of the interaction.

Further another object of the invention is to provide an inertial sensing input controller, a receiver and an interactive system using thereof, in which the motion parameters generated by the inertial sensing input controller are transmitted to an electrical device directly for enabling the electrical device to process the motion parameters and thus determine an action or scenario based upon the received motion parameters so as to increase the diversity of interactions.

In an exemplary embodiment, the present invention provides an inertial sensing input controller, comprising: an inertial sensing module, being configured with at least an inertial sensor, for sensing at least a control motion and thus correspondingly generating at least an inertial sensing parameter; an interface unit, for generating at least an input signal; a switch unit, for selecting one input mode out of a plurality of input modes; and a remote control unit, coupled to the switch unit, the interface unit and the inertial sensing module for generating and thus transmitting a control signal according to the selected input mode, the at least one input signal and the at least one inertial sensing parameter.

In an exemplary embodiment, the present invention provides an inertial sensing input controller, comprising: an inertial sensing module, being configured with at least a first inertial sensor, for sensing at least a control motion and thus correspondingly generating at least a first inertial sensing parameter; an interface unit, for generating at least an input signal; a switch unit, for selecting one input mode out of a plurality of input modes; a plurality of second inertial sensors, capable of sensing at least a control motion and thus correspondingly generating at least a second inertial sensing parameter; a remote control unit, coupled to the switch unit, the interface unit and the inertial sensing module for generating and thus transmitting a control signal along with the at least one first and the at least one second inertial sensing parameters according to the selected input mode, the at least one input signal, the at least one first inertial sensing parameter, and the at least one second inertial sensing parameter;

and an electronic device, capable of performing a computation upon the at least one first and the at least one second inertial sensing parameters received from the remote control unit.

In an exemplary embodiment, the present invention provides a receiver, comprising: a receiving unit, for receiving the control signal from the remote control unit and thus decoding the control signal into the at least one inertial sensing parameter, the at least an input signal and the selected input mode; an operation unit, coupled to the receiving unit for analyzing the at least one inertial sensing parameter into at least a motion signal while generating an operation signal according to the at least one input signal and the selected input mode; and an interface connecting unit, for transmitting the operation signal and the at least one motion signal to an electronic device.

In an exemplary embodiment, the present invention provides an interactive system, comprising: an inertial sensing module, being configured with at least a first inertial sensor, for sensing at least a control motion and thus correspondingly generating at least a first inertial sensing parameter; an interface unit, for generating at least an input signal; a switch unit, for selecting one input mode out of a plurality of input modes; a plurality of second inertial sensors, capable of sensing at least a control motion and thus correspondingly generating at least a second inertial sensing parameter; a remote control unit, coupled to the switch unit, the interface unit and the inertial sensing module for generating and thus transmitting a control signal according to the selected input mode, the at least one input signal, the at least one first inertial sensing parameter, and the at least one second inertial sensing parameter; a receiver, for receiving the control signal from the remote control unit and thus decoding the control signal into the at least one first and the at least one second inertial sensing parameters, the at least one input signal and the selected input mode; and an electronic device, capable of performing a computation basing upon the at least one first and the least one second inertial sensing parameters, the at least one input signal and the selected input mode.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 4 shows an input mode selection of the present invention.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
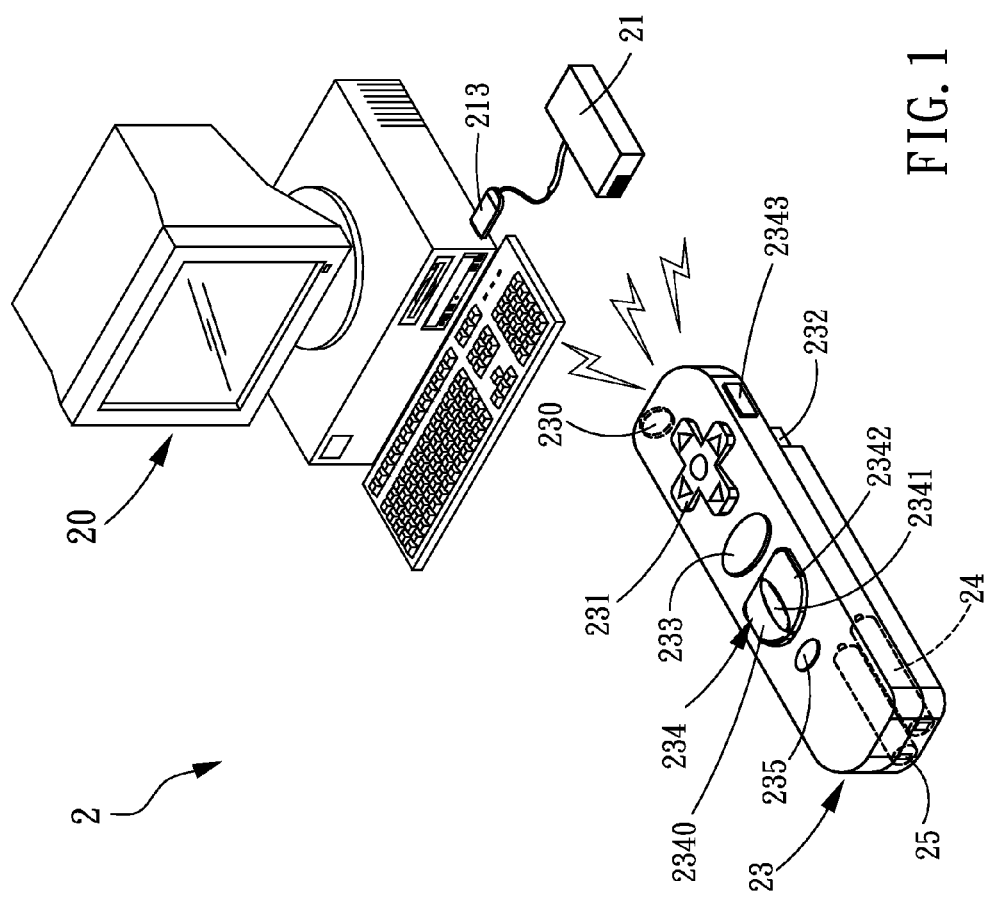
FIG. 1 shows an interactive system according to a first embodiment of the invention.

Please refer to FIG. 1, which shows an interactive system according to a first embodiment of the invention. In FIG. 1, the interactive system 2 is comprised of an electronic device 20, a receiver 21 and an inertial sensing input controller 23, by which users of the interactive system 2 can use the inertial sensing input controller 23 to interact with a multimedia software executed in the electronic device 20 through the receiver 21. In this embodiment, the electronic device 20 is a computer. Nevertheless, the electronic device 20 can be an interactive gamming device, an interactive multimedia device, other game consoles with computation ability, or the like. In this embodiment, the receiver 21 is coupled to the electronic device 20 via a universal serial bus (USB) interface 213, however, it is not limited thereby.

It is noted that the inertial sensing input controller 23 can communicate with the receiver 21 in a wireless manner. Moreover, the wireless communication between the inertial sensing input controller 23 and the receiver 21 is enabled by a way selected from the group consisting of Bluetooth communication and radio frequency (RF) communication, but is not limited thereby. As shown in FIG. 1, there is a power switch 230 arranged at the front of the inertial sensing input controller 23, and moreover, there are a plurality of press-keys arranged on a surface of the inertial sensing input controller 23, such as the cross key 231, the front key 232, the key A 233, the control keypad 234 and the key B 235 as shown in FIG. 1. It is noted that those press-keys can be added or eliminated as required that it is not limited by this embodiment. An accommodation space is formed in the inertial sensing input controller 23 for receiving a battery pack 24 to be used as the power supply of the inertial sensing input controller 23. In addition, a charging interface 25 is from at an end of the inertial sensing input controller 23 for charging the same therethrough. As methods for charging the inertial sensing input controller 23 are known to those skilled in the art, and thus are not described further herein.

Figure 2:
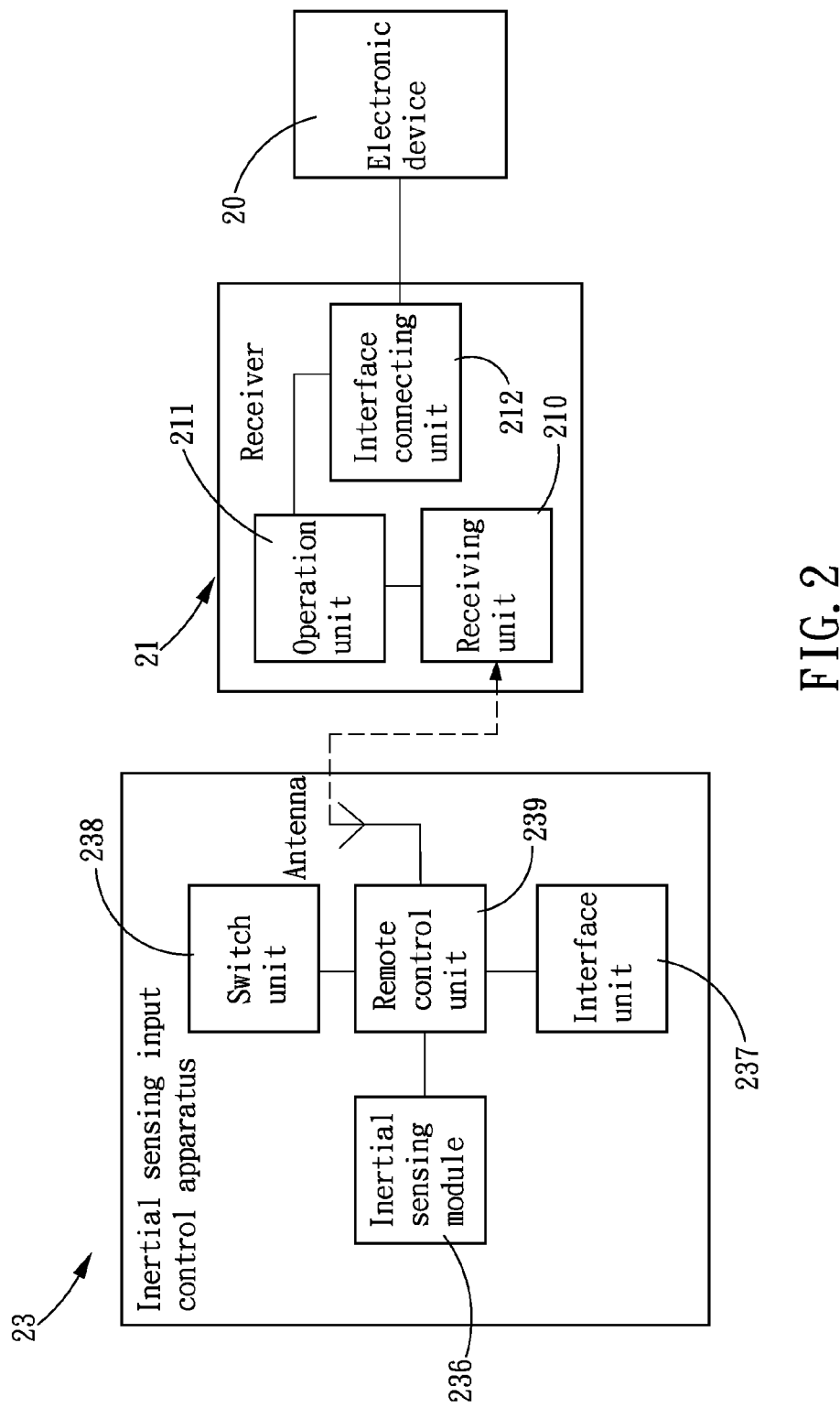
FIG. 2 is a schematic block diagram depicting the interactive system of the first exemplary embodiment.

Please refer to FIG. 2, which is a schematic block diagram depicting the interactive system of the first exemplary embodiment. The inertial sensing input controller 23 comprises an inertial sensing module 236, a switch unit 238, a remote control unit 239 and an interface unit 237. The inertial sensing module 236, being configured with at least an inertial sensor, is used for sensing at least a control motion and thus correspondingly generating at least an inertial sensing parameter. It is noted that each inertial sensor can be a device selected from the group consisting of a gyroscope, an accelerometer, and the combination thereof. As the inertial sensor is designed to detect the limb movements of a user, other than inside the inertial sensing module 236, each of which can be attached to a specific location of the user's body, such as the abdomen, the front arm, the leg, and so on, but is not limited thereby. In this embodiment, each inertial sensor is arranged inside the inertial sensing input controller 23.

In FIG. 2, the interface unit 237, used for generating at least an input signal, is electrically connected to the plural press-keys arranged on a surface of the inertial sensing input controller 23 of FIG. 1, so that when any one key or any key combination is pressed, the interface unit 237 will receiving a signal corresponding to the key-pressing and then transmitting the signal to the remote control unit 239. Moreover, the switch unit 238 is electrically connected to the mode switch key 2343 of FIG. 1 so as to be used for selecting an input mode for the inertial sensing input controller 23, in which the input mode, is a mode selected from the group consisting of a mouse mode, a joystick mode, a keyboard mode and the combination thereof, but is not limited thereby. The aforesaid input mode is defined with respect to the I/O protocol of different input interfaces. The remote control unit 239 is coupled to the inertial sensing module 236, the interface unit 237 and the switch unit 238 for enabling the remote control unit 239 to generate and thus transmit a control signal to the receiver 21 according to the selected input mode, the at least one input signal and the at least one inertial sensing parameter. It is noted that the wireless communication of the remote control unit 239 with the receiver 21 is enabled by a RFID means or a Bluetooth means.

As shown in FIG. 2, the receiver 21 comprises a receiving unit 210, an operation unit 211 and an interface connecting unit 212. The receiving unit 210 is used for receiving a control signal generated from the remote control unit and thus decoding the control signal into an inertial sensing parameter, at least an input signal and the selected input mode. The operation unit 211 is coupled to the receiving unit 210 for analyzing the inertial sensing parameter into at least a motion signal while generating an operation signal according to the at least one input signal and the selected input mode. The interface connecting unit 212 is used for transmitting the operation signal and the at least one motion signal to the electronic device 20. Moreover, the communication between the interface connecting unit 212 and the electronic device 20 can be realized in a wired or wireless manner, in which the wireless communication can be enabled by Bluetooth or radio frequency communication, such as radio frequency identification (RFID) means; and the wired communication can be enabled by the use of an universal serial bus (USB) port, or other connection port, such as RS232 or SCSI, but is not limited thereby.

The communication between the inertial sensing input control apparatus and the receiving end is illustrated in FIG. 1 and FIG. 2. For instance, when a user playing a multimedia game or an interactive software on the interactive system 2 of FIG. 1, the inertial sensing input controller 23 which can be held in one hand of the user is enabled to detect the movement of the hand by the inertial sensing module 236 configured therein and thus generate an inertial sensing parameter accordingly. In addition, during the proceeding of the multimedia game or interactive software, the user can enhance his/her interaction with the game and the user by the use of those press-keys formed on the inertial sensing input controller 23, such as cross key 231, the key A 233 or the key B 235.

Figure 3:
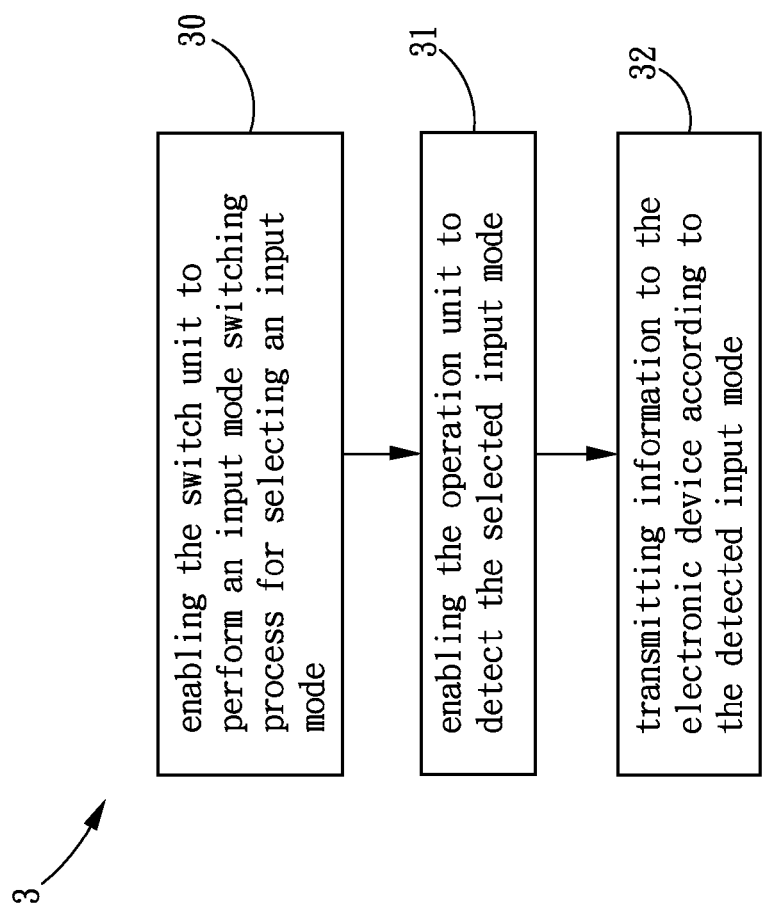
FIG. 3 is a flow chart illustrating the steps of an input mode selection process executed in the present invention.

Furthermore, also during the proceeding of the multimedia game or interactive software, the user can use the mode selection key 2343 for directing the switch unit 238 to select an input mode for the inertial sensing input controller 23. Please refer to FIG. 3, which is a flow chart illustrating the steps of an input mode selection process executed in the present invention. The flow starts from step 30. At step 30, the switch unit 238, directed by the mode selection key 2343, performs an input mode switching process for selecting an input mode, in that the switch unit 238 selected an input mode according to the received mouse input flag value, the joystick input flag value and the keyboard input flag value as shown in FIG. 4; and then the flow proceeds to step 31. At step 31, the operation unit 211 of the receiver 21 is enabled to detect the selected input mode; and then the flow proceeds to step 32. At step 32, information is transmitted to the electronic device 20 according to the detected input mode. That is, the switch unit 238 is going to perform an evaluation to determine values of a mouse input flag, a joystick input flag and a keyboard input flag so as to select an input mode according to those flag values. Please refer to FIG. 4, which shows an input mode selection of the present invention. In an exemplary embodiment shown in FIG. 4, a plurality of input modes are defined with respected to different flag value combinations, that is, by assigning the aforesaid flags to be either 1 or 0, an input mode can be selected and used for transmitting data to the electronic device 20. For instance, when the mouse input flag is 0 while the joystick and keyboard input flags are both 1, the joystick+keyboard mode will be selected.

Figure 5A:
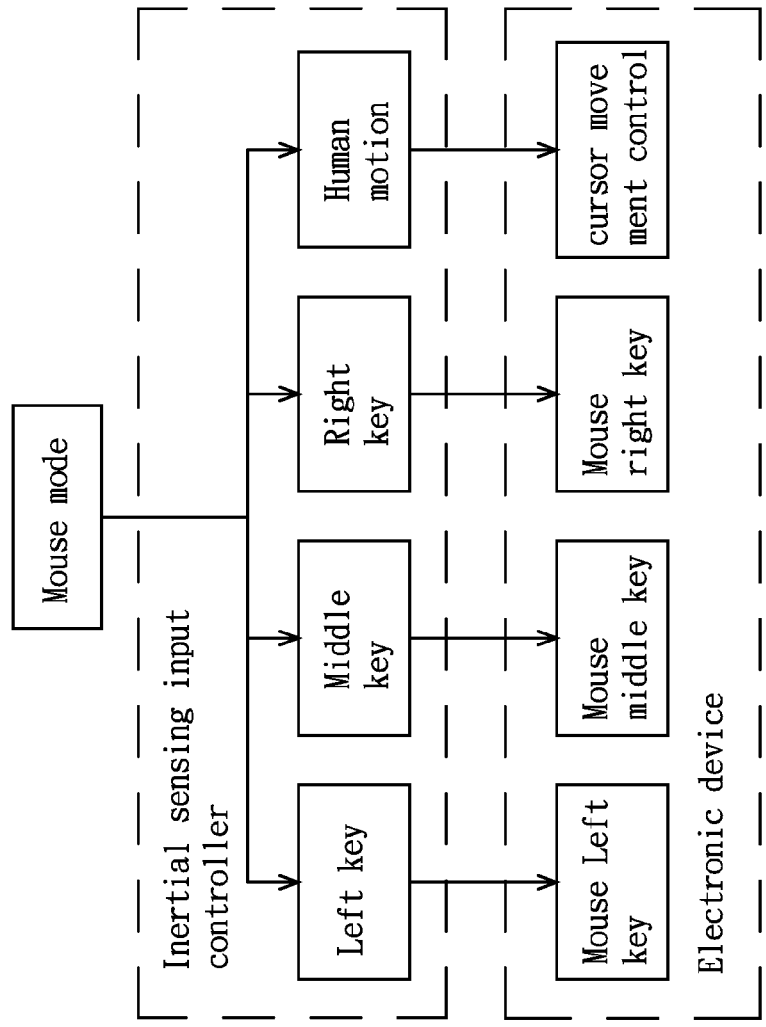
FIG. 5A is a schematic diagram illustrating how an input control apparatus of the invention is configured to imitate a mouse when the mouse mode of the input control apparatus is selected.

In the exemplary embodiment of FIG. 1 and FIG. 2, the mouse mode is selected for illustration. Please refer to FIG. 5A, which is a schematic diagram illustrating how an inertial sensing input controller of the invention is configured to imitate a computer mouse when the mouse mode of the input control apparatus is selected. As shown in FIG. 5A, the inertial sensing input controller 23 will mimic a computer mouse to interact with the electronic device 20. For instance, when the left key 2340 of the inertial sensing input controller 23 is pressed, the electronic device 20 will respond just like the left key of a mouse is pressed, and that is the same to the middle key 2341 and the right key 2342. Moreover, when the inertial sensing input controller 23 is moved, the cursor displayed in the display unit of the electronic device 20 is going to move accordingly.

Figure 5B:
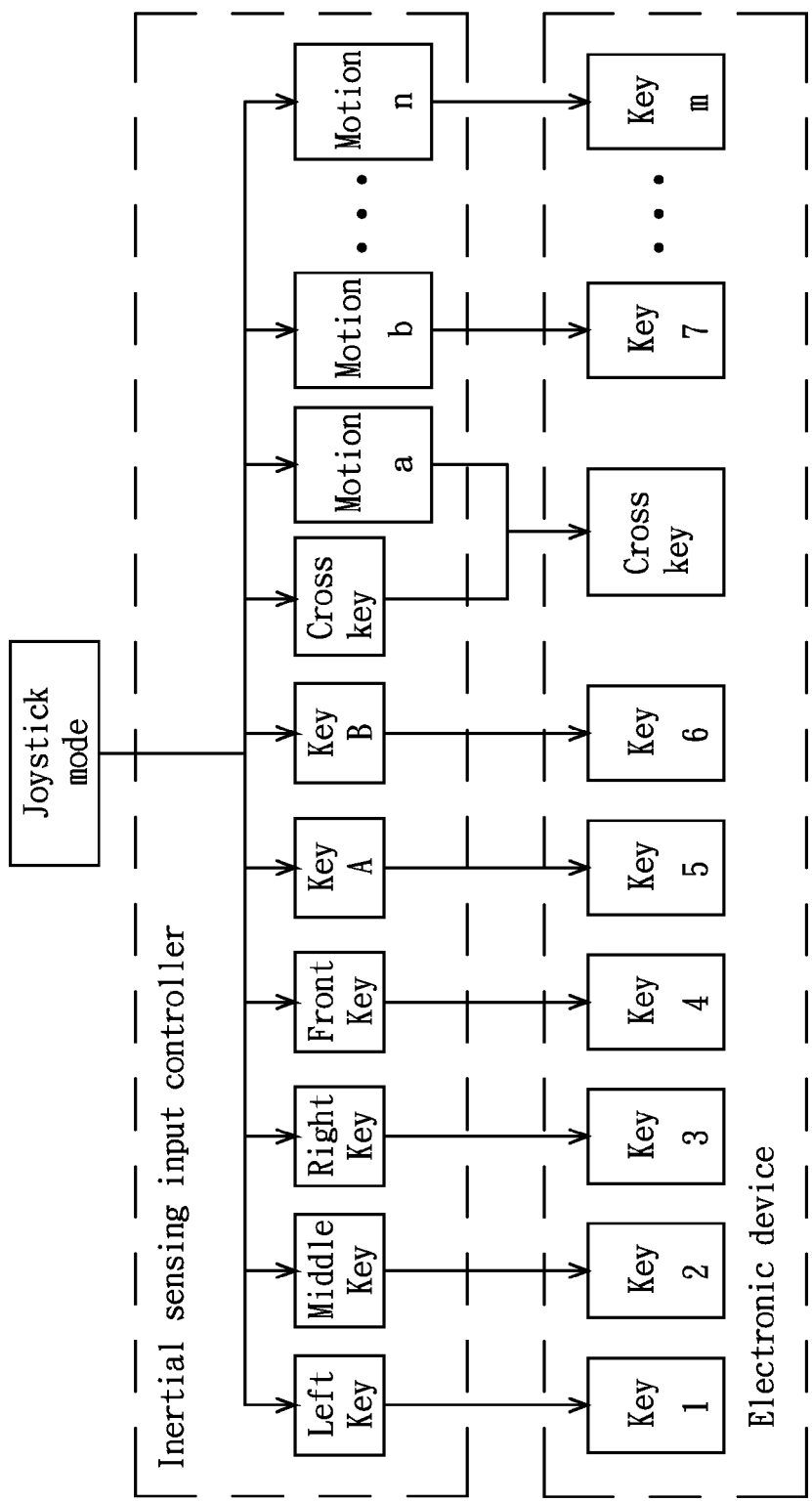
FIG. 5B is a schematic diagram illustrating how an input control apparatus of the invention is configured to imitate a joystick when the joystick mode of the input control apparatus is selected.
Figure 5C:
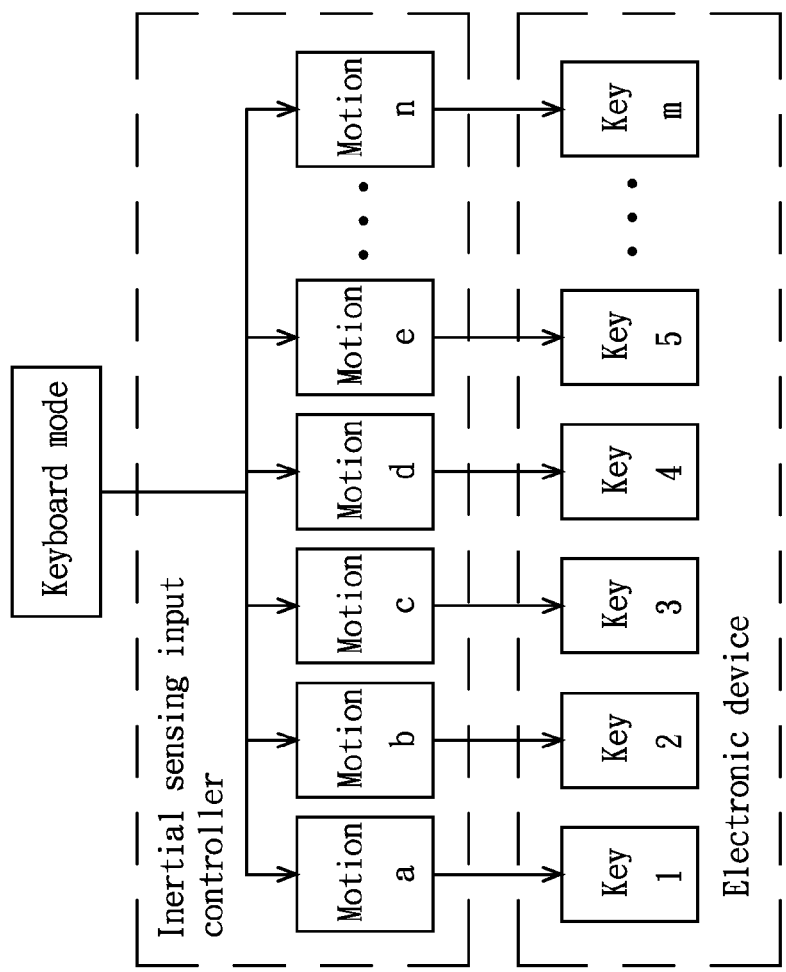
FIG. 5C is a schematic diagram illustrating how an input control apparatus of the invention is configured to imitate a keyboard when the keyboard mode of the input control apparatus is selected.

FIG. 5B is a schematic diagram illustrating how an inertial sensing input controller of the invention is configured to imitate a joystick when the joystick mode of the input control apparatus is selected; and FIG. 5C is a schematic diagram illustrating how an inertial sensing input controller of the invention is configured to imitate a keyboard when the keyboard mode of the input control apparatus is selected. As shown in FIG. 5B, the inertial sensing input controller 23 in such joystick mode can assign its press-keys and motions detected by the inertial sensing module thereof to correspond to different keys of a joystick. Similarly, as shown in FIG. 5C, the inertial sensing input controller 23 in such keyboard mode can assign various inertial sensing parameters to various motions detected by the inertial sensing module thereof and thus further to correspond to different keys of a keyboard.

Figure 6:
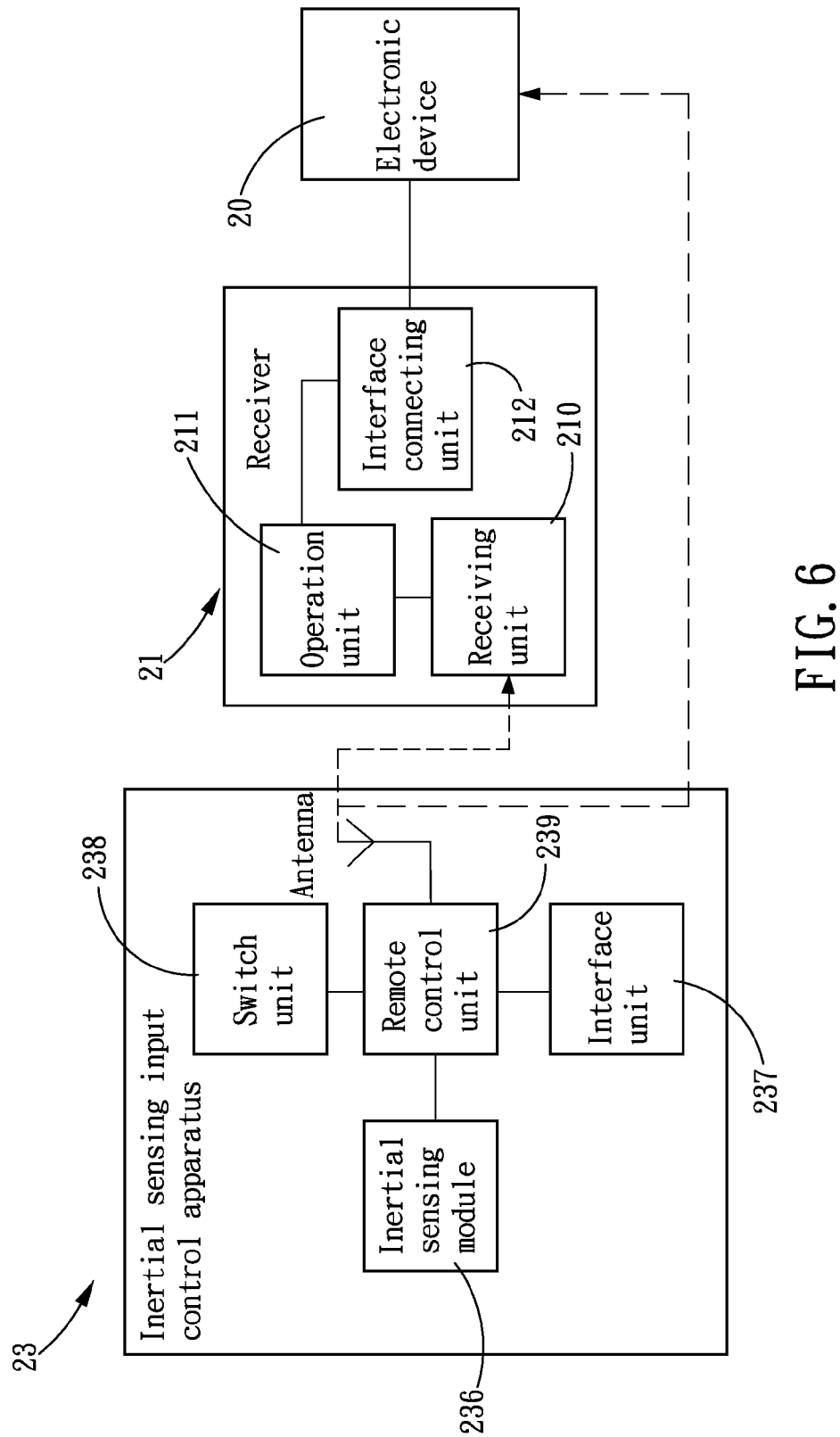
FIG. 6 is a schematic block diagram depicting the interactive system of a second exemplary embodiment.

Please refer to FIG. 6, which shows an interactive system according to a second embodiment of the invention. Basically, the interactive system of the second embodiment is configured similar to that of the first embodiment, but is different in that: the remote control unit 239 of the second embodiment is capable of transmitting the inertial sensing parameters detected thereby directly to the electronic device 20 for enabling the electronic device 20 to perform a computation directly for enhancing the interaction performance of a game executed in the electronic device 20 with a player.

Figure 7A:
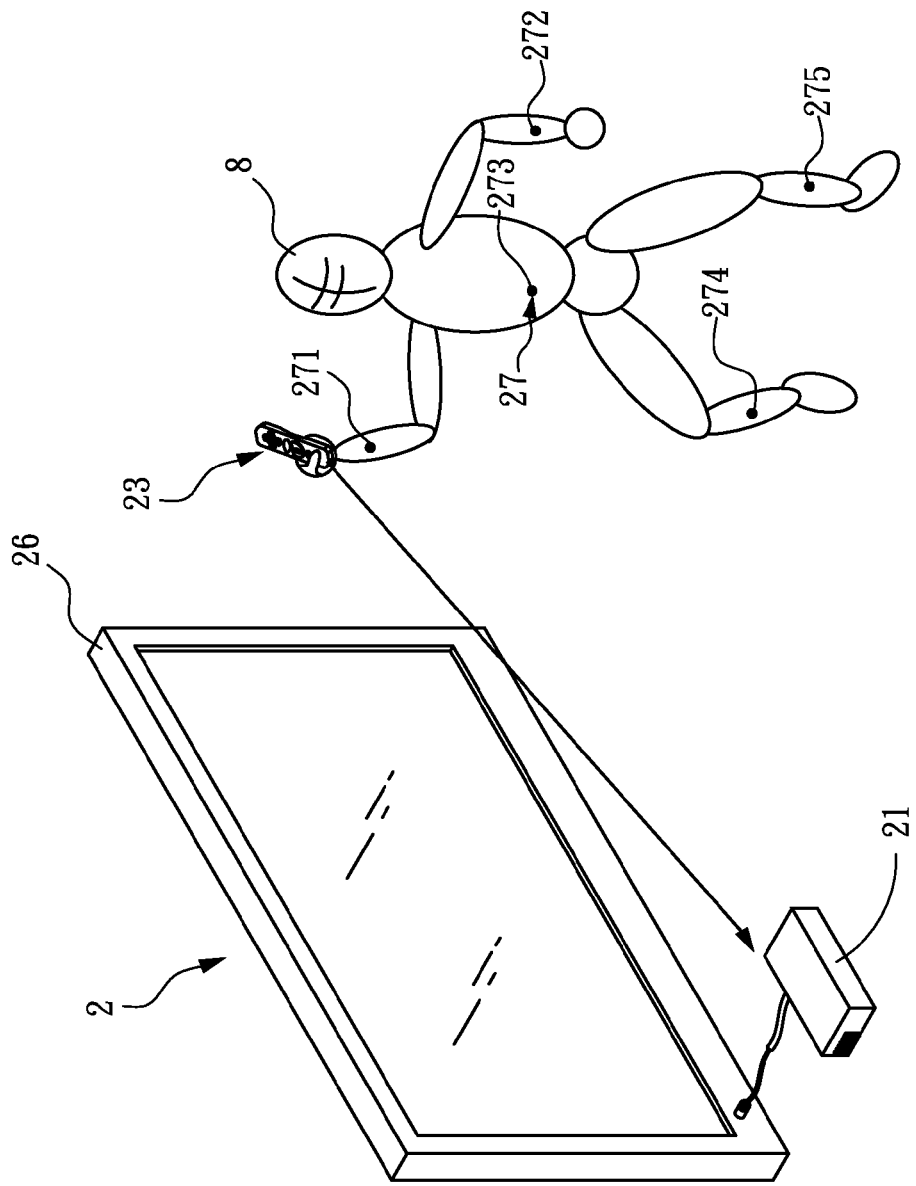
FIG. 7A shows an interactive system according to the second embodiment of the invention.

Please refer to FIG. 7A, which shows an interactive system according to the second embodiment of the invention. In this second embodiment, the interactive system comprises: a multimedia device 26, a receiver 21, an inertial sensing input controller 23 and a second inertial sensing module 27, in which the multimedia device 26 can be an assembly of a flat panel display and a game console with computation ability. It is noted that the receiver 21 is coupled to the inertial sensing input controller 23 in a manner similar to those described in FIG. 1 and FIG. 2, and thus is not described further herein.

The second inertial module 27 includes a plurality of second inertial sensors, as those 271~275 shown in FIG. 7A, that each second inertial sensor is capable of attaching itself onto a movable object for detecting motions of that movable object and this correspondingly generating a second inertial sensing parameter. In the embodiment shown in FIG. 7A, the movable object is a user and the second inertial sensors 271~275 are designed to attach on the user's body at positions such as limbs and abdomen. In a third embodiment shown in FIG. 7B, each of the second inertial sensors 271~275 is configured with a wireless transmitter 2710, that is used for transmitting the second inertial parameter to the inertial sensing input controller 23.

Figure 7B:
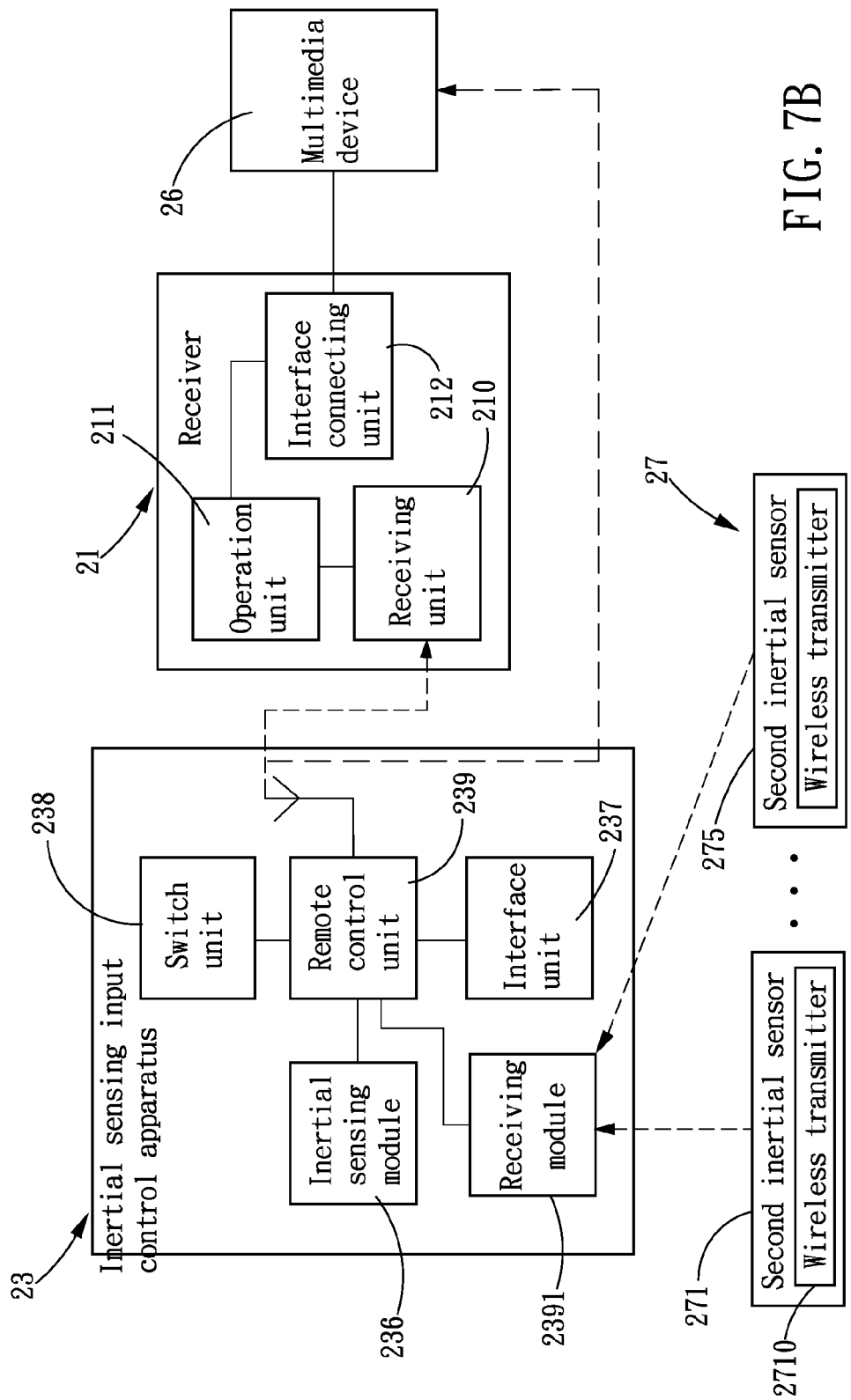
FIG. 7B is a schematic block diagram depicting the interactive system of a third exemplary embodiment.

The operations of the aforesaid inertial sensing input controller and the receiver are the same as those described hereinbefore, and thus are not described further herein. However, the operation of the second inertial sensing module 27 of the interactive system is detailed in the following. As shown in FIG. 7A and FIG. 7B, As soon as the receiving module 2391 of the inertial sensing input controller 23 receives the second inertial sensing parameters generated from the second inertial sensors 271~275 of the second inertial sensing module 27, which are respectively transmitted by the wireless transmitters of the second inertial sensors 271~275, the receiving module 2391 will transmit the received second inertial sensing parameters to the remote control unit 239, and thereafter, the remote control unit 239 is going to operate similar to that described in the first embodiment. It is noted that the attaching of the plural second inertial sensors 271~275 on user's body is going to promote the interaction between the user and the electronic device. Moreover, by the selection of the switch unit 238 in the inertial sensing input controller 23, the motions detected by the second inertial sensing module 27 can be integrated with the key-pressing and motion detection of the inertial sensing input controller 23 in a manner similar to those shown in FIG. 5A to FIG. 5C.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. For instance, the inertial sensing input controller can be a device capable of imitating functions of various input devices or the combination of various input devices, such as the mouse, the joystick and the keyboard shown in FIG. 5A to FIG. 5C, by which a user playing the interactive system of the invention will not need to shift between different input devices just for meeting different control requirements of the interaction. Moreover, a plurality of such inertial sensing input control apparatuses can be connected with each for meeting the control requirements of a comparatively more complicated game executing on the electronic device, or the control requirements of game required to be played by both hands.

To sum up, the inertial sensing input controller, receiver and interactive system using thereof are capable of sensing a sequence of motions of the human body and generating the corresponding parameters and also integrating a plurality of input modes for enabling an electrical device interacting with the inertial sensing input controller under an operation mode defined by the selected input mode the inertial sensing input controller.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inertial sensing input controller, comprising:
    an inertial sensing module, being configured with at least an inertial sensor, for sensing a sequence of motions of a human body and generating motion parameters;
    an interface unit, for generating and transmitting at least an input signal corresponding to a selected input mode of the inertial sensing input controller, a defined combination of at least one pressed key of the inertial sensing input controller actuated by a user, and the motion parameters;
    a switch unit having three registers for holding three flag values, each flag value representing a mouse, a joystick, and a keyboard, respectively, the switch unit further comprising a single key other than the pressed key for selecting said one input mode form the group consisting of a mouse mode, a joystick mode, a keyboard mode, and all combination thereof; and
    a remote control unit, coupled to the switch unit, the interface unit, and the inertial sensing module for generating and thus transmitting a control signal according to the selected input mode, the at least one input signal and the motion parameters.

2. The inertial sensing input controller of claim 1, wherein each inertial sensor is a device selected from the group consisting of at least a gyroscope, at least an accelerometer, and the combination thereof.

3. The inertial sensing input controller of claim 1, wherein the interface unit is coupled to at least an input unit; and the input unit is a device selected from the group consisting of a cross key, an assembly of a plurality of press buttons, and the combination thereof.

4. The inertial sensing input controller of claim 1, further comprising:
    a receiver, including:
        a receiving unit, for receiving the control signal from the remote control unit and thus decoding the control signal into the motion parameters, the at least an input signal, and the selected input mode;
        an operation unit, coupled to the receiving unit for analyzing the motion parameters into at least a motion signal while generating an operation signal according to the at least one input signal and the selected input mode; and
        an interface connecting unit, for transmitting the operation signal and the at least one motion signal to an electronic device.

5. The inertial sensing input controller of claim 4, wherein the electronic device is a device selected from the group consisting of a computer, an interactive gaming device and an interactive multimedia device.

6. The inertial sensing input controller of claim 4, wherein the interface unit is electrically connected to the electronic device by a means selected from the group consisting of a wired means and a wireless means; and the wired means is enabled by an USB interface; and the wireless means is enabled by a way selected form the group consisting of Bluetooth communication and radio frequency (RF) communication.

7. The inertial sensing input controller of claim 4, wherein the remote control unit is able to transmit the motion parameters directly to the electronic device.

8. The inertial sensing input controller of claim 4, wherein the operation unit is able to detect the input mode selected by the switch unit and thus correspondingly transmits signals to the electronic device according to the detected input mode.

9. An inertial sensing input controller, comprising:
   an inertial sensing module, being configured with at least a first inertial sensor, for sensing at least a sequence of motions of a human body and generating a first set of motion parameters;
   an interface unit, for generating and transmitting at least an input signal corresponding to a selected input mode of the inertial sensing input controller and a defined combination of at least one pressed key of the inertial sensing input controller actuated by a user, and the motion parameters;
   a switch unit having three registers for holding three flag values, each flag value representing a mouse, a joystick and a keyboard, respectively, the switch unit further comprising a single key other than the pressed key for selecting said one input mode form the group consisting of a mouse mode, a joystick mode, a keyboard mode, and all combination thereof;
   a plurality of second inertial sensors, capable of sensing at least a control motion and thus correspondingly generating a second set of motion parameters;
   a remote control unit, capable of receiving the second set of motion parameters while coupling to the switch unit, the interface unit and the inertial sensing module for generating and thus transmitting a control signal according to the selected input mode, the at least one input signal, the first set of motion parameters, and the at least one second inertial sensing parameter; and
   an electronic device, capable of performing a computation according to the control signal received from the remote control unit.

10. The inertial sensing input controller of claim 9, wherein each inertial sensor is a device selected from the group consisting of at least a gyroscope, at least an accelerometer, and the combination thereof.

11. The inertial sensing input controller of claim 9, wherein the interface unit is coupled to at least an input unit; and the input unit is a device selected from the group consisting of a cross key, an assembly of a plurality of press buttons, and the combination thereof.

12. The inertial sensing input controller of claim 9, further comprising:
   a receiver, including:
      a receiving unit, for receiving the control signal from the remote control unit and thus decoding the control signal into the first and second set of motion parameters, the at least an input signal and the selected input mode;
      an operation unit, coupled to the receiving unit for analyzing the first set of motion parameters into at least a motion signal while generating an operation signal according to the at least one input signal and the selected input mode; and
      an interface connecting unit, for transmitting the operation signal and the at least one motion signal to an electronic device for computation.

13. The inertial sensing input controller of claim 12, wherein the interface unit is electrically connected to the electronic device by a means selected from the group consisting of a wired means and a wireless means; and the wired means is enabled by an USB interface; and the wireless means is enabled by a way selected form the group consisting of Bluetooth communication and radio frequency (RF) communication.

14. The inertial sensing input controller of claim 9, wherein the electronic device is a device selected from the group consisting of a computer, an interactive gaming device and an interactive multimedia device.

15. The inertial sensing input controller of claim 9, wherein the remote control unit is able to transmit the at least one first and second inertial sensing parameters directly to the electronic device.

16. The inertial sensing input controller of claim 12, wherein the operation unit is able to detect the input mode selected by the switch unit and thus correspondingly transmits signals to the electronic device according to the detected input mode.

17. An interactive system, comprising:
   an inertial sensing module, being configured with at least a first inertial sensor, for sensing at least a sequence of motions of a human body and generating a first set of motion parameters;
   an interface unit, for generating and transmitting at least an input signal corresponding to a selected input mode of the inertial sensing input controller and a defined combination of at least one pressed key of the inertial sensing input controller actuated by a user;
   a switch unit having three registers for holding three flag values, each flag value representing a mouse, a joystick, and a keyboard, respectively, the switch unit further comprising a single key other than the pressed key for selecting said one input mode from the group consisting of a mouse mode, a joystick mode, a keyboard mode, and all combination thereof;
   a plurality of second inertial sensors, capable of sensing at least a control motion and thus correspondingly generating a second set of motion parameters;
   a remote control unit, coupling to the switch unit, the interface unit and the inertial sensing module for generating and thus transmitting a control signal according to the selected input mode, the at least one input signal, the first set of motion parameters, and the second set of motion parameters;
   a receiver, for receiving the control signal from the remote control unit and thus decoding the control signal into the first set of motion parameters, the at least an input signal and the selected input mode; and
   an electronic device, capable of performing a computation upon the first and second set of motion parameters.

\* \* \* \* \*